US008694633B2

(12) United States Patent
Mansfield et al.

(10) Patent No.: US 8,694,633 B2
(45) Date of Patent: Apr. 8, 2014

(54) CURATING COMMUNICATIONS

(71) Applicant: Forget You Not, LLC, Waban, MA (US)

(72) Inventors: Richard J. W. Mansfield, Cambridge, MA (US); Nissim Shani, Waban, MA (US); Daniel Shani, Waban, MA (US)

(73) Assignee: Forget You Not, LLC, Waban, MA (US)

( * ) Notice: Subject to any disclaimer, the term of this patent is extended or adjusted under 35 U.S.C. 154(b) by 0 days.

(21) Appl. No.: 13/650,941

(22) Filed: Oct. 12, 2012

(65) Prior Publication Data

US 2013/0325978 A1    Dec. 5, 2013

Related U.S. Application Data

(63) Continuation-in-part of application No. 13/489,210, filed on Jun. 5, 2012.

(51) Int. Cl.
*G06F 15/173* (2006.01)

(52) U.S. Cl.
USPC ............................ 709/224; 709/206; 709/217

(58) Field of Classification Search
USPC .......................................... 709/206, 217, 224
See application file for complete search history.

(56) References Cited

U.S. PATENT DOCUMENTS

| | | | |
|---|---|---|---|
| 5,634,667 A * | 6/1997 | Jordan | ............................. 281/29 |
| 6,324,736 B1 | 12/2001 | Atrio | |
| 7,499,897 B2 | 3/2009 | Pinto et al. | |
| 7,562,058 B2 | 7/2009 | Pinto et al. | |
| 7,603,292 B1 | 10/2009 | Bragg et al. | |
| 7,680,882 B2 | 3/2010 | Tiu, Jr. et al. | |
| 7,725,300 B2 | 5/2010 | Pinto et al. | |
| 7,730,003 B2 | 6/2010 | Pinto et al. | |
| 7,809,805 B2 | 10/2010 | Stremel et al. | |
| 7,933,762 B2 | 4/2011 | Pinto et al. | |
| 7,933,810 B2 | 4/2011 | Morgenstern | |
| 7,953,654 B2 | 5/2011 | Abifaker | |
| 7,970,657 B2 | 6/2011 | Morgenstern | |
| 8,046,882 B2 | 11/2011 | Rojdev et al. | |
| 8,108,501 B2 | 1/2012 | Birnie et al. | |
| 8,135,624 B1 | 3/2012 | Ramalingam et al. | |

(Continued)

FOREIGN PATENT DOCUMENTS

| | | |
|---|---|---|
| JP | 2006-107369 | 4/2006 |
| JP | 2008-234341 | 10/2008 |

(Continued)

OTHER PUBLICATIONS

Owen, Sara, et al., "How Mobile Vouchers are Transforming Mobile Marketing", First Data Corporation, 2011 (9 pages).

(Continued)

*Primary Examiner* — Phuoc Nguyen
(74) *Attorney, Agent, or Firm* — Fish & Richardson P.C.

(57) ABSTRACT

A computer-implemented method includes notifying a first person that a significant event is going to occur with respect to a second person; receiving from the first person, the second person, or another person a communication that relates to the significant event and to the first person and that has been curated at least in part from information that has been accumulated automatically from online resources; and sending the curated communication to the communication target.

28 Claims, 13 Drawing Sheets

(56) References Cited

U.S. PATENT DOCUMENTS

| | | |
|---|---|---|
| 8,140,403 B2 | 3/2012 | Ramalingam et al. |
| 8,165,853 B2 | 4/2012 | Pinto et al. |
| 8,190,519 B1 | 5/2012 | Angilivelil et al. |
| 2002/0072925 A1 | 6/2002 | Krim |
| 2003/0009461 A1 | 1/2003 | Notargiacomo et al. |
| 2004/0078283 A1* | 4/2004 | Gary ..................... 705/26 |
| 2005/0154706 A1 | 7/2005 | Notargiacomo et al. |
| 2005/0234762 A1 | 10/2005 | Pinto et al. |
| 2005/0262212 A1 | 11/2005 | Arslan et al. |
| 2006/0242037 A1 | 10/2006 | Tanimura et al. |
| 2008/0005666 A1 | 1/2008 | Sefton et al. |
| 2008/0089489 A1 | 4/2008 | Katkam et al. |
| 2008/0102856 A1 | 5/2008 | Fortescue et al. |
| 2008/0147430 A1* | 6/2008 | Hawthorne ................ 705/1 |
| 2008/0189188 A1 | 8/2008 | Morgenstern |
| 2008/0201924 A2 | 8/2008 | Sinclair |
| 2008/0255988 A1 | 10/2008 | Maltese |
| 2009/0055482 A1 | 2/2009 | Zhang et al. |
| 2009/0125410 A1* | 5/2009 | Perlman ................... 705/26 |
| 2009/0197681 A1 | 8/2009 | Krishnamoorthy et al. |
| 2009/0233618 A1 | 9/2009 | Bai et al. |
| 2009/0265382 A1 | 10/2009 | Freiman et al. |
| 2009/0271486 A1 | 10/2009 | Ligh et al. |
| 2009/0276284 A1 | 11/2009 | Yost |
| 2009/0311992 A1 | 12/2009 | Jagetiya |
| 2009/0327129 A1 | 12/2009 | Collas et al. |
| 2010/0169160 A1 | 7/2010 | Wu et al. |
| 2010/0223341 A1 | 9/2010 | Manolescu et al. |
| 2010/0262449 A1 | 10/2010 | Monteforte et al. |
| 2011/0022602 A1 | 1/2011 | Luo et al. |
| 2011/0047229 A1 | 2/2011 | Sinha et al. |
| 2011/0071956 A1 | 3/2011 | Pinto et al. |
| 2011/0078173 A1 | 3/2011 | Seligmann et al. |
| 2011/0081007 A1 | 4/2011 | Bar-Yoav |
| 2011/0099048 A1 | 4/2011 | Weiss et al. |
| 2011/0168828 A1 | 7/2011 | Mori |
| 2011/0238474 A1 | 9/2011 | Carr et al. |
| 2011/0238755 A1 | 9/2011 | Khan et al. |
| 2011/0313946 A1 | 12/2011 | Browne et al. |
| 2012/0016678 A1 | 1/2012 | Gruber et al. |
| 2012/0150740 A1 | 6/2012 | Isaacson et al. |
| 2012/0315876 A1 | 12/2012 | Srinivasan |
| 2013/0041740 A1* | 2/2013 | Tyler et al. ................ 705/14.35 |

FOREIGN PATENT DOCUMENTS

| | | |
|---|---|---|
| JP | 2011-101337 | 5/2011 |
| JP | 2003-256560 | 9/2013 |
| WO | WO2013/184793 | 12/2013 |

OTHER PUBLICATIONS

Lane, Nick, "Mobile geo-location advertising will be a big number in 2015", Mobile Squared, retrieved from the Internet, Feb. 24, 2012 (15 pages).

Todd, Greg, "Using Predictive Analytics to Determine the Best Offer", Information Management, Sep. 22, 2008 (13 pages).

Gillies, Donald, "Causality, Propensity, and Bayesian Networks", 2002 (18 pages).

Darren, "New HR Celebration Toolkit—Birthdays, Long Service Awards, Weddings and more . . . ", Voucher Shop, Jul. 23, 2012 (3 pages).

"McDonald's Debuts New Geolocation Mobile Ad Campaign", Marketing Vox, Jan. 31, 2012 (2 pages).

U.S. Appl. No. 13/489,210, filed Jun. 5, 2012 with pending claims.

U.S. Appl. No. 13/715,517, filed Dec. 14, 2012 with pending claims.

GiftsOnTime, "Gift Management Simplified", retrieved from Internet on May 14, 2012, www.giftsontime.com, 2012 (1 page).

U.S. Appl. No. 13/489,210, filed Jun. 5, 2012 including pending claims.

Transaction history of U.S. Appl. No. 13/489,210 to Oct. 11, 2012.

"Donor organ storage machine keeps kidneys fresher, boosts transplant success," Daily Mail Reporter, Jan. 1, 2009, 1 page.

The interest of the unbord child (nasciturus), from http://wikistudent.ws/Unisa, 2006, 41 pages.

International Search Report and Written Opinion from PCT application No. PCT/US2013/044301 mailed Aug. 21, 2013 (17 pages).

Transaction history of U.S. Appl. No. 13/489,210.

Transaction history of U.S. Appl. No. 13/715,517.

\* cited by examiner

CURATING COMMUNICATIONS

CROSS-REFERENCE TO RELATED APPLICATIONS

This application is a continuation-in-part application of and claims priority to U.S. application Ser. No. 13/489,210, filed on Jun. 5, 2012, the entire contents of which are incorporated here by reference.

BACKGROUND

This description relates to communicating information about one party to another party.

A typical user of a social networking website communicates with other users of the social networking website by posting information about himself or information of interest to other users of the social network website in a manner that is accessible to the other users. For example, a user of a social networking website might post background information about himself, such as current job or activity information; information about events attended, such as concerts; events the user plans to attend, such as travel vacation sites; or personal events, such as birthdays or anniversaries. A user may also post information about recent acquisitions, such as the purchase of a new automobile or smartphone. Other users who have access to the user's posted information may contact the user to comment or review information about common shared interests or for other reasons.

Some social networking websites filter or group connections based on, e.g., friendship, profession or job type, or geographical location. Social networks often span users within a single generation (e.g., Generation X or Generation Y) or at least within a limited age demographic.

SUMMARY

In a general aspect, a computer-implemented method includes notifying a first person that a significant event is going to occur with respect to a second person; receiving from the first person, the second person, or another person a communication that relates to the significant event and to the first person and that has been curated at least in part from information that has been accumulated automatically from online resources; and sending the curated communication to the communication target.

Embodiments may include one or more of the following.

The method further includes detecting an occurrence of the significant event. In some cases, the method further includes receiving information provided by the first person defining at least one condition for occurrence of the significant event. In sonic cases, detecting an occurrence of the significant event includes conducting an automated analysis of publicly available (a) online or mobile social networking facilities, (b) online or mobile periodicals, and (c) websites.

Receiving the communication includes receiving an approval of an automatically generated communication.

Receiving the communication includes receiving a communication that has been generated by the first person and that includes at least sonic of the information that has been accumulated.

The method further includes receiving an identification of the second person from the first person.

In another general aspect, a computer-implemented method includes, in connection with an occurrence of a significant event of a person the conditions for occurrence of which had been defined earlier by a user, automatically generating a page of a website or a mobile application or an email application that is associated with the significant event of the person and includes information generated by and received from the user, information about, the person, and information associated with the person that has been obtained by automated analysis of publicly available (a) online or mobile social networking facilities, (b) online or mobile periodicals, and (c) websites, and serving the page for display through a web browser or a mobile application or an email application.

Embodiments may include one or more of the following.

The page is served after the user is given an opportunity to curate the page.

Curating the page includes adding content to the page, removing content from the page, and/or changing content on the page.

The page is served to an editor and then re-served after the editor has curated it, and the editor is designated by the user.

The page is served without input from the user.

Notification of the occurrence of the significant event is given automatically to someone, in particular someone who needs to take some action regarding the event. In sonic cases, notification of the occurrence of the significant event is given automatically to the user.

The method further includes detecting the occurrence of the significant event.

Detecting the occurrence of the significant event includes conducting an automated analysis of publicly available (a) online or mobile social networking facilities, (b) online or mobile periodicals, and (c) websites. In some cases, conducting an automated analysis includes conducting the analysis in view information provided by the user defining the conditions for occurrence of the event.

The page is served in the future to parties whose existence and identity with respect to the user and the significant event is undetermined at the time when the conditions for occurrence are defined.

The user is a service provider and the person is a client of the service provider.

The user is an agent of a company, the person is an employee of the company, and the page is served as a corporate email message or as a website on an internal corporate network.

The user is an agent of a charitable foundation or university and the person is a donor to the charitable foundation or university.

The page includes information that is generated by and received from another user and is about the person.

The page includes information that is generated by and received from the person and is about the person.

The event is a death of the person.

Serving the page includes serving the page to a relative of the person.

The event is a birthday or anniversary of the person.

The event is a change in employment status of the person.

Serving the page includes delivering a notification of the page to a recipient via a private communication.

The recipient is the person.

The private communication channel includes email, telephone, short message service (SMS) messaging, and/or social network facilitated communication.

Serving the page includes publishing the page as a website.

The website is available to a group of people sharing a common affiliation.

These and other aspects, features, implementations, and advantages, and combinations of them, can be expressed as methods, apparatus, systems, components, program products, business methods, and means or steps for performing functions, or combinations of them.

Other features, aspects, implementations, and advantages will become apparent from the description, the drawings, and the claims.

DESCRIPTION

The system that we describe here enables a person (sometimes called a curator) to generate and/or curate a message (e.g., a multimedia message) to be published or to be delivered to one or more other people in response to a significant event (e.g., a life event such as a birthday, marriage, anniversary, death, or other life event; a promotion or other change in employment status; or another event, such as purchasing a car or voting in an election) of the person generating the message, the person receiving the message, or another person. We sometimes refer to such a person as the "significant event person". For instance, the system described here can be used to automatically deliver birthday greetings, sympathy messages, messages of congratulations, or obituaries to the recipient. We sometimes refer to such messages as communications. The message can be communicated in the present or at future times, e.g., at a time that is suggested by or associated with the significant event, which may have already occurred or which may occur in the future. The system is able to automatically detect occurrence of such a significant event and to populate the message or a draft of the message with content generated by the person generating and/or curating the message and content obtained via automated analysis of various sources of information, such as websites, publications, social networks, and other online sources, among others.

Figure 1:
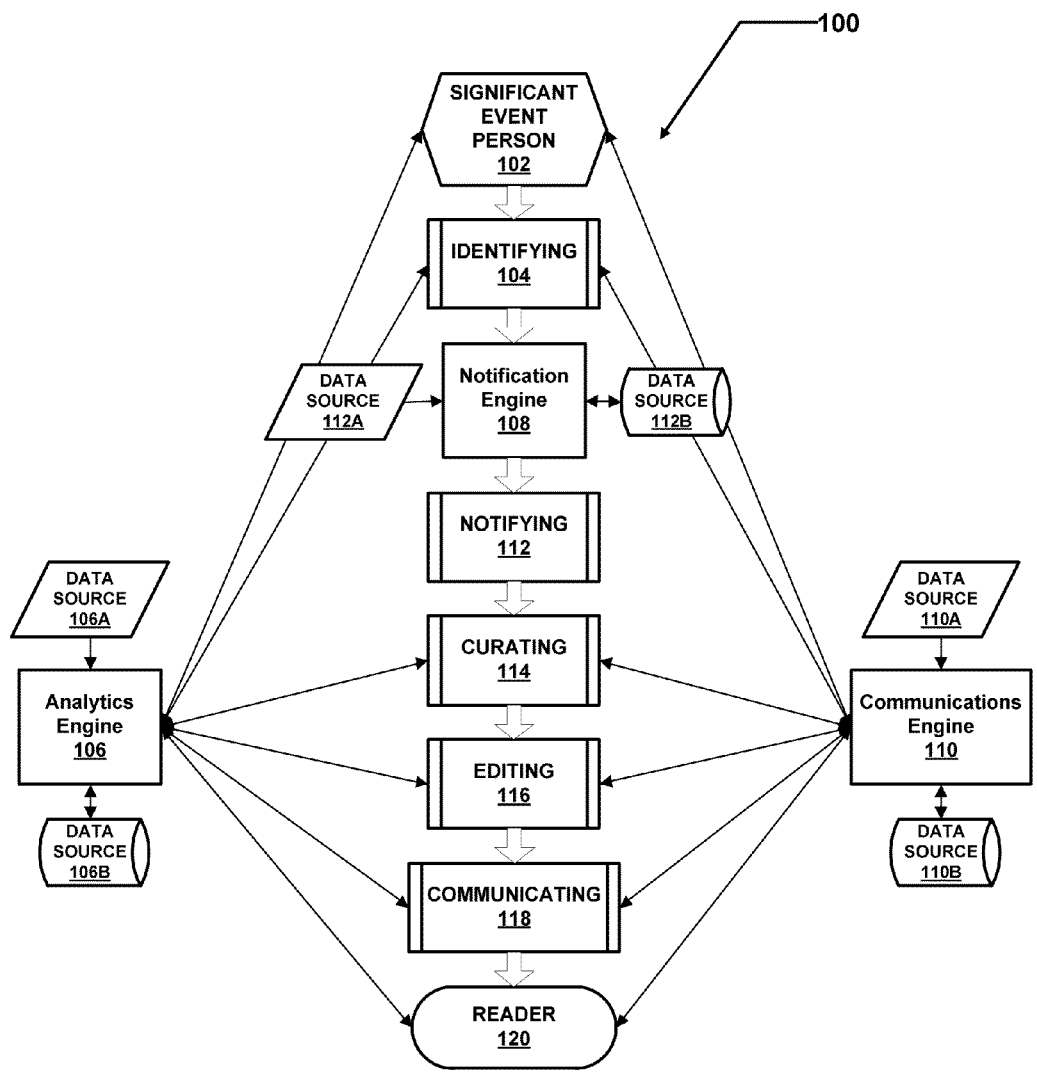
FIG. 1 is a functional diagram of the system actions for communicating messages.

FIG. 1 is a functional diagram of an example of process for communicating items, e.g., communicating messages (e.g., multimedia messages) about significant events from a publisher user to a reader user, using a system 300. A Significant Event Person 102, the associated trigger event, and any requisite action(s) are identified for registration in a Notification Engine 108 (step 104). The identification may rely on the publisher's direct personal knowledge of the Significant Event Person 102 and may sometimes be assisted by an interest profile and status information about the Significant Event Person 102 obtained from a Communication Engine 110, information about the significant event person 102 determined analytically by an Analytics Engine 106, or both, in an automated fashion as described in more detail below. The trigger event may be an event with a definite date such as a birthday. The trigger event may also be an event with a threshold probability for occurrence, such as a point in time at which the significant event person has a high propensity for purchasing an automobile. When the trigger event occurs, the Notification Engine 106 notifies the publisher (step 112), allowing the publisher to generate and curate a message for a Reader 120 (step 114), who may or may not be the significant event person. Curating the message may be aided by an interest profile and status information of the Reader 120 and/or the significant event person obtained from a Communication Engine 110 or information determined analytically from various sources about the Significant Event Person and/or Reader from an Analytic Engine 106 or both in an automated fashion as described in more detail below. The curated message may be subject to Editing (step 116) by one or more editors 320, including reviewing, revision, and/or commenting. The editors 320 may also be aided by the interest profile and status information of the Reader 120 and/or the significant event person obtained from a Communication Engine 110 or information determined analytically from various sources about the Significant Event Person 102 and/or the Reader 120 from an Analytic Engine 106 or both m an automated fashion as described in more detail below. The curated and possibly edited message Communicated (step 118), including delivery of the message to the reader 120 and/or the significant event person and/or publication of the message. The communication of the message may be aided by interest profile and status information of the Reader 120 and/or the significant event person obtained from a Communication Engine 110 or information determined analytically from various sources about the Reader 120 and/or the significant event person from an Analytic Engine 106 or both in an automated fashion as described in more detail below.

Figure 2:
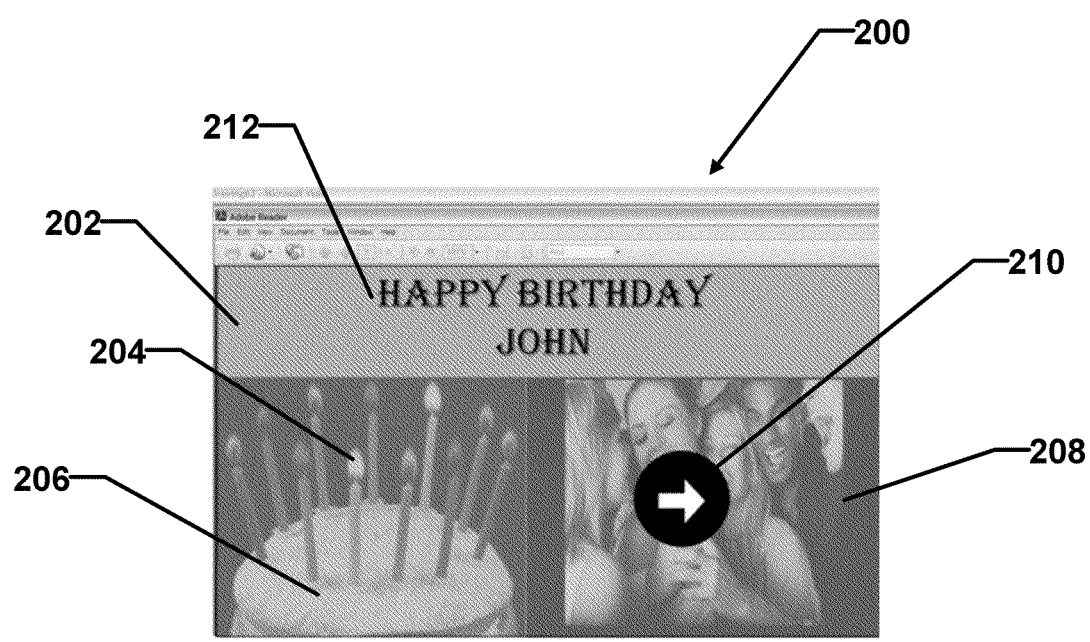
FIG. 2 is an example of a document generated by the system for multimedia communications.

FIG. 2 is an example of a media message 200 curated for a Significant Event Person. In this example, the media message 200 is a birthday greeting for a person named John, where John is both the significant event person and the reader. The media message 200 consists of a background 202 upon which are superimposed one or more verbal/text messages 212 together with one or more objects 206 and 208 with varying components 204, 210. In this example, the curator has superimposed the image of an object the birthday cake, 206 upon a patterned colored background 202 then added animated elements including the flaming candles 204 and a video clip 208 of friends singing "Happy Birthday," which can be initiated by a video start control 210.

In another example involving purchasing cars, the Significant Event Person 102 and the Reader 120 each represent classes of individuals and the communication process relies heavily on automated support provided by the system. To identify the triggering event (i.e., a likely time at which a car will be purchased), the Analytic Engine 106 uses historical data regarding past purchases obtained from profiles collected by the Communication Engine 110 to enable predictive analytics (e.g., as discussed in greater detail below) to determine the joint propensity of the Significant Event Person to purchase a particular brand of automobile at a particular time of year. Notification to the Curator/System occurs at a point in time (e.g., in March) when that joint propensity reaches a predetermined threshold level determined by the Notification Engine 108. Curation of a message involves automated generation of a personalized marketing letter to the Reader for the brand of automobiles, in some cases with collateral material, such as an advertising brochure or a $500 Discount coupon. Curation of the message is supported by information determined by the Analytics Engine 106 and personal profile information determined by the Communication Engine 110. This automated curation process may be sampled by an Editor for quality control.

As used here, the term publication refers broadly to, for example, distribution of the communication to the public, e.g., on a publically available website; or to a relatively large number of people, e.g., on an internal corporate website accessible to some or all employees of the corporation. The term delivery refers broadly to, for example, delivery of the communication to one or more particular recipients via a private communication, such as via email, short message service (SMS) messaging, telephone, communication via a social networking service, or another type of private communication.

In general, a publisher user retains oversight over the generation and curation of the message. For instance, the publisher user may identify a person whose significant event is to be identified, specify the content of and/or delivery options for the message, and otherwise oversees the message. We use the term publisher broadly to include, for example, a party that is going to make it communication publicly available and also to a party who is going to send a message privately to one or more specific targets. An editor user may also be involved in the curation of the message, e.g., by reviewing the message and then adding or removing material from an automatically generated message. In some examples, the publisher user and the editor user are the same user. The recipient of the message is referred to as the reader user. In some examples, the message is generated by the publisher user and/or the editor user based on background information provided by the system. In some examples, the message is automatically drafted in the name of the publisher user, and the message is subject only to brief review by the publisher user and/or the editor user.

In some examples, the system is implemented in the context of a social network, in which one or more of the publisher user and the reader user is a member of a community of users of a network, for example, service providers and clients, employees of a corporation, members of a community that includes multiple generations of an extended family, a group of friends or any other group of people or entities known or unknown to each other, and combinations of any two or more of those. In other examples, none of the users has a membership in or other affiliation with a social network. Implementations of the system are not limited to social networks. For instance, the system may allow a publisher user to create an account with the system to generate the communication item without joining a social network and/or may allow a publisher user to interact with the system as a guest without creating an account. The system may also allow the communication item to be sent to reader users who do not belong to a social network or who are not enrolled in the system.

The publisher user(s) and reader user(s) of a particular communication item may be related in any of a variety of ways, including, e.g., as family members (of a single generation or of multiple generations), friends, members of an interest group, employees of the same corporation, or any other type of relationship, and may or may not be members of the same social network or of any social network.

In an example implementation of the system, publication of a multimedia message (which we also refer to as a communication item) occurs at a future time associated with a significant event of a person about whom or for whom a publisher user is constructing the communication item. The publisher user is, e.g., the person or entity that arranges for or causes publication or delivery of the communication item. For instance, the publisher user may be a service provider, such as attorney, that arranges for a congratulatory message to be sent whenever one of his clients is promoted. As another example, the publisher user may be a grandfather that arranges for birthday greetings to be sent automatically to each of his grandchildren on the appropriate date.

An editor user, who may be designated by the publisher user, reviews, edits, and/or comments on the message prior to publication or delivery of the message. For example, if the publisher has composed his life story for future publication as his obituary, an editor may be authorized to review and revise the communication in keeping with social norms or family sensibilities and/or may be permitted to add his own observations about significant events of the publisher. As another example, the editor user may be the attorney's associate or assistant who proofreads the message and confirms the accuracy of the statements made in the congratulatory message prior to delivery of the message.

Once published or delivered, the communication item is read by a reader user at the communication time. The communication time can be a specific day (e.g., the reader user's birthday) and even a specific time on a specific day (e.g., on the morning of the reader user's birthday), or can be defined less specifically as a period of time (for example, during a grandchild's $13^{th}$ year) or as an event (e.g., upon the marriage of the fourth great-grandchild).

One or more of the publisher user, editor user, and/or reader user may he the same person. For instance, the publisher user and the editor user may be the same person, or the reader user may be the publisher user in the future (e.g., if the publisher user wants to send himself a communication item for his own $50^{th}$ birthday). In addition, the person whom the communication item is about may be none of the publisher user, the editor user, or the reader user. For instance, the publisher user may be a son who is preparing an obituary about his deceased father for distribution to the family and friends (the reader users) of the father.

The content of the communication item may be about the publisher user, the editor user, the reader user, and/or another person. For instance, if the communication item is a birthday greeting to the reader user from the publisher user, the communication item may include, e.g., photographs of the reader user or an anecdote written by the publisher user about an experience the publisher user and the reader user shared. As another example, if the communication item is an obituary for the death of the publisher user's father, the communication item may include information about the life of the father but no information about either the publisher user or the reader users, who are the father's family and close friends. As still another example, if the publisher user is using the system to prepare his own future obituary, then the communication item will include information about the publisher user but no information about the reader users, who will be the close friends and family of the publisher user.

In some cases, one or more of the publisher user, the editor user, and the reader user are members of the community served by the network, and we sometimes use the terms publisher users or editor users or reader users and members interchangeably. However, the publisher user and/or reader user need not have been or be a member of the network community. For example, when a grandfather, who is not a member of the network community, dies, his son, who is a member, may assemble a multimedia message about the grandfather's significant events and publishes the media message on a website for the grandfather's not yet living great-grandchildren, who may never be members of the network.

In some instances, deliveries (we sometimes refer to communications as deliveries) maybe scheduled for events such as, e.g., the death of an individual; birthdays, anniversaries, bar mitzvahs, first communions, or other special occasions; a high school or college graduation; the birth of a child; or an accomplishment such as a promotion or attainment of an achievement or award. More generally, deliveries may be scheduled at any time pre-specified by the publisher user in general or specific terms. The form or context of the communications made using the system may be multimedia messages, and other types of communications. The communication items can be an unlimited variety of communications, and other items.

In some examples, the communication time is named specifically in advance, e.g., by the publisher user. For instance, the publisher user may specify that the communication time is Jan. 17, 2013. In other examples, conditions for determining the communication time can be defined, e.g., by the publisher user. For instance, the publisher user may specify that the communication item is to be published or delivered upon the death of a particular person without specifying the exact date. Upon detecting the person's death, the system notifies the publisher user to publish or deliver the communication item and/or automatically publishes or delivers the communication item. In still other examples, the communication time can be determined later by the system itself or by the system with the help of others. For instance, the system may detect the occurrence of a significant event of a person named as a person of interest by the publisher user (e.g., the publisher user specifies a particular client as a person of interest, and the system detects when the client receives a promotion).

A Notification Engine 108 of the system determines an appropriate delivery date to be used as the communication time by detecting the occurrence of a significant event (e.g., any significant event or a particular significant event specified by the publisher user). The engine can base this determination, for example, on data associated with the reader user, predetermined criteria specified by the publisher user, and/or other information. In some examples, the engine detects the occurrence of a significant event by monitoring publicly available sources of information or private sources of information to which the engine has been granted access. These sources of information include, e.g., online or mobile social networking facilities, online or mobile periodicals (e.g., newspapers, magazines, scientific journals, university alumni magazines, newsletters of interest groups, and other periodicals), and/or websites. For instance, if the publisher user has specified a list of individuals of interest for whom he wants to be alerted to all detected significant events, the system monitors the sources of information to detect the occurrence of a significant event for any of the specified individuals, such as a promotion, an award, or a death (e.g., by detecting a press release describing the person's promotion, a newspaper article about the person's award, or an obituary published in a local newspaper). As another example, if the publisher user has specified an person and a particular significant event (e.g., the birth of the person's first child), the system monitors the sources of information to detect when the child is born (e.g., by detecting a status update on a social networking facility).

At the communication time (e.g., at the date or time specified by the publisher user and/or upon occurrence of a significant event detected by the system), the communication item is published or delivered. The communication item includes information generated by, received from, about the reader user, and/or otherwise associated with the reader user, the publisher user, and/or another person (e.g., the person whose significant event triggered the communication). The communication item may be a page of a website, a mobile application, or an email application. For instance, the communication item may be a congratulatory email sent to the reader user on his birthday, or may be a welcome website provided to a new employee on his first day at his new job. The communication item may be or include, e.g., verbal communications, such as text, digitized handwriting, voice recordings, or other types of digital speech; photographs, such as scanned physical photographs and other digital images; video, other media formats that can be served over the Internet or another type of communications network; or other types of communications.

In some cases, the entire communication item has been prepared and assembled prior to the communication time. For instance, the publisher user may have specified the exact content of a message to be communicated (e.g., the publisher user prepares a standard birthday greeting message that is to be sent to each of a list of individuals on their birthday). In other cases, some or all of the communication item is prepared by the publisher user and/or by the system at the communication time. For instance, at the communication time, the publisher user or editor user may be prompted to modify or add content to a previously prepared message or to confirm that the previously prepared message is up-to-date. As another example, the Predictive Analytics Engine 106 may assemble some or all of the message at the communication time based on previously collected data and/or data collected at the communication time.

The Predictive Analytics Engine 106 may generate some or all of the message based on data associated with the reader user, the publisher user, and/or another person (e.g., the person whose significant event triggered the communication) and/or based on predetermined criteria specified by the publisher user or by the system. For example, the Predictive Analytics Engine 106 conducts an automated analysis of publicly available and/or private sources of information to which it has access, including, e.g., online or mobile social networking facilities, online or mobile periodicals, and/or websites to identify information to be included in the communication item. For instance, upon the death of an individual specified by the publisher user, the Predictive Analytics Engine 106 prioritizes and selects information collected by the Communication Engine 110 about the individual, including, e.g., a list of the individual's awards, publications, employment history, family connections, and/or other information.

The reader users may be specified by the publisher user and/or recommended by the system. For instance, the publisher user may specify that the communication item is a birthday greeting to be sent to his mother, who is the reader user. As another example, the publisher user may specify that a new employee greeting be sent to all new employees (the reader users) of a corporation without specifying the exact identity of the new employees; in this case, the system detects the identities of the new employees (e.g., based on analysis of human resources databases to which it has access). In still another example, the communication item is an obituary, the publisher user specifies only that the reader users are to be close friends and family members of the deceased, and the system identities close friends and family members of the deceased based on analysis of social networking activity of the deceased.

Thus, the publisher user is able to specify the content of the communication items, the communication times, and/or the readers of the communication either specifically or by criteria that can be used to determine the specific items, times, and/or readers. In some implementations, an engine, for example, an Analytics Engine, can participate in the determinations. In some cases, people other than the publisher can have a role. For instance, editors designated by the publisher may revise or comment upon a communication item. As another example, a parent of a child designated as a reader may be authorized to participate in the determination of when the child will receive a communication item and the content of the item to be communicated.

The layout of the communications, including, e.g., the relative positions of the various types of information included in the communication item, may be specified by the publisher user, arranged automatically by the system, or some combination of the two. For instance, the system may prepare a draft communication based on a standard template and offer the publisher user the opportunity to alter the layout of the communication prior to publication or delivery.

In some examples, the predictive Analytics Engine may recommend actions to be taken. For example, if a deceased individual has requested donations to a named charitable foundation lieu of flowers, a suggestion to donate to the named charity may be included in the communication item. The actions may be recommended based on a statement from the publisher user (e.g., the publisher user states his own preferences to be recited in his obituary upon his death) or may be recommended based on an automated analysis (e.g., the Analytics Engine may determine the charitable intentions of the deceased by analyzing an obituary in a local newspaper). The actions may also be recommended based on the system's knowledge of another party. For instance, the system may recommend a particular charity for donations on behalf of the deceased by analyzing the profile and/or affinities of the deceased or the deceased's next of kin.

In some examples, when the delivery date (we sometimes refer to the communication time as the delivery date) occurs, the reader user may be notified by the system) and delivery of the communication item can be arranged, if appropriate. For instance, the system may send an email to the reader user directing the reader user to visit a specified webpage to view the communication item, in some cases, delivery notification of the communication item may be given by a member of the network to a non-member (e.g., from a parent who is a member to her four-year-old daughter, who is not), or to a member as a proxy for a non-member (e.g., to a parent as a proxy for her daughter).

In some cases, materials are stored in a storage module, e.g., in a digital capsules associated with the publisher user's account with the system. In some cases, the publisher user may be provided with a prompt to prepare material for inclusion in the communication item or to be used to prepare a communication at a later date. For instance, a different subject may be provided regularly, such as monthly, as a prompt to the publisher user. Example subjects may include questions about what the user hopes or expects to see or experience in the future (e.g., what the user hopes to accomplish within the next year); questions about the use's personal thoughts (e.g., what are the user's favorite things, which ethnic or religious groups does the user identify with); questions about current events (e.g., the user's opinion about a current election or political controversy); questions about the user's daily life (e.g., a description of "a day in the life" of the user); or other prompts. The subjects may be provided uniformly to all publisher users who maintain significant event records, or the subjects may be tailored to each user or to a subgroup of users (e.g., children may receive different prompts than adults). Other digital materials may also be stored in a user's digital account, including, e.g., digital photographs, digital audio, digital videos, scanned documents (e.g., scanned copies of a graduation program),recordings of conversations, and other types of digital materials. In some examples, the user can email or upload the digital material to a server of the system, which stores the material in the user's digital capsule.

In some embodiments, the system may provide a phone number that a user can dial to have a conversation recorded and stored directly in the user's digital capsule. The phone number may be a general phone number such that the user enters an identification code in order to access his account; or the phone number may be a phone number specific to the user. When the user dials the phone number, he may be presented with a prompt, such as the example prompts listed above; or he may be given the opportunity to record an open-ended conversation. The user may be prompted to dial the phone number, e.g., by an email message, a short message service (SMS) message, or a phone call. In some cases, the user may be prompted to select what to do with the recording, such as when and to whom to release the recording. The contents of the digital capsule may be accessed by the publisher user when preparing a communication item. For instance, the user may want to include photographs of a memorable vacation in a birthday greeting for his mother. The digital capsule itself may also be a communication item to be published or delivered to a reader user. In general, the digital capsule and its contents can be subjected to instructions of the publisher user about the reader or readers, the editor or editors, the communication time, and other information that will control the use of the digital capsule and its contents.

In one specific example, the system is employed by an attorney to monitor and send messages for notable significant events for each of his clients. The attorney provides a list of clients and a list of notable significant events to be monitored by the system, such as employment promotions and new jobs. When the system detects that, for instance, one of the listed clients has been promoted, the Notification Engine 108 notifies the attorney that such event has occurred for that client. The attorney composes a message of congratulations to the client based on background information provided by the system, such as information about the client (e.g., news clippings about the promotion or about the client's recent awards) analyzed by the Analytics Engine 106. For instance, the attorney may include in the message suggestions of additional projects involving that attorney's work that are now pertinent to the client's new position. The communication item is reviewed by the attorney's associate, whom the attorney has designated as an editor. Upon making any necessary corrections, the attorney arranges for the communication item to be sent to the client, e.g., by sending an email to the client using the best address determined by a Communication Engine 110 of the system or by instructing the system to send an email on his behalf.

In another specific example, a university maintains, in the system, a list of major donors to the university. If the Notification Engine 108 detects the death of one of the individuals on the list, information about that individual is ordered and selected by the Analytics Engine 106 and provided to the publisher user (e.g., an agent of the university who specified or maintains the list). The publisher user composes (curates) a sympathy message to be sent to the donor's next of kin or other close family members, who are identified and located by the Communication Engine 110. In addition, the publisher user may instruct a vendor such as a florist to send an appropriate arrangement of flowers or may make a contribution to an appropriate charity in the name of the deceased, e.g., based on a recommendation by the Analytics Engine 106.

In another specific example, the system is used by the Human Resources (HR) Department of a corporation to send a welcome message to each new employee on his first day of work. In some cases, the HR department provides a list of newly hired individuals and a list of associated start dates. In other eases, the system is given access to HR databases or other corporate databases and the Analytics Engine 106 determines, from the information in the databases, the identity and start date of the new employees. On the start date of each new employee, the Notification Engine 108 triggers the automated assembly, by the Analytics Engine 106, of a welcome message. The welcome message is based on a template and includes a message from the president of the corporation or chairman of the board, depending on the rank of the newly hired individual. The welcome message also includes relevant professional information about the new employee collected by the Communication Engine 110 from various data sources, such as the employee's social networking profile, the employee's publically available resume, and scientific journals or news publications including articles written by the employee. The automatically generated message is reviewed and approved by an editor user, such as an HR employee. The system then publishes or delivers the approved personalized welcome message (e.g., in a private message to the employee or as a website available to some or all employees of the corporation) at the start of business on the individual's start date. The HR department may also employ the system in this manner to generate messages for employee promotions and/or retirements.

In another specific example, a funeral director maintains a list of clients who have contracted for funeral services at a funeral home after their death. When the system detects the death of one of the clients, a significant event used as a trigger by the Notification Engine 108, a notification is sent to the funeral director. A draft obituary is prepared by the system using the Analytics Engine 106, including, e.g., information collected in part by the Communication Engine 110 about the client from publically available and/or privately accessible sources (e.g., a list of the client's awards, publications, employment history, or other information), materials provided by the client prior to his death (e.g., photographs, essays, or other materials), and/or information provided by the funeral director (e.g., contact information for the client's next of kin, the name of a preferred charity, or other information). The funeral staff and/or the family of the deceased may act as editor users to edit the obituary prior to its publication, e.g., to ensure its accuracy, to ensure that it complies with any family or personal sensitivities, to ensure that it includes information the editor user deems important, or to perform any other sort of review. After finalization, the obituary is published on the website of the funeral home.

The system can be implemented in a very wide variety of ways. In some examples, the system is implemented on a social network platform and the publisher user, editor user, and/or reader users are members of the social network. However, the system can also be implemented in a wide variety of other ways as well, some of which do not involve use of a social network platform, and concepts encompassed in such a system.)

Figure 3:
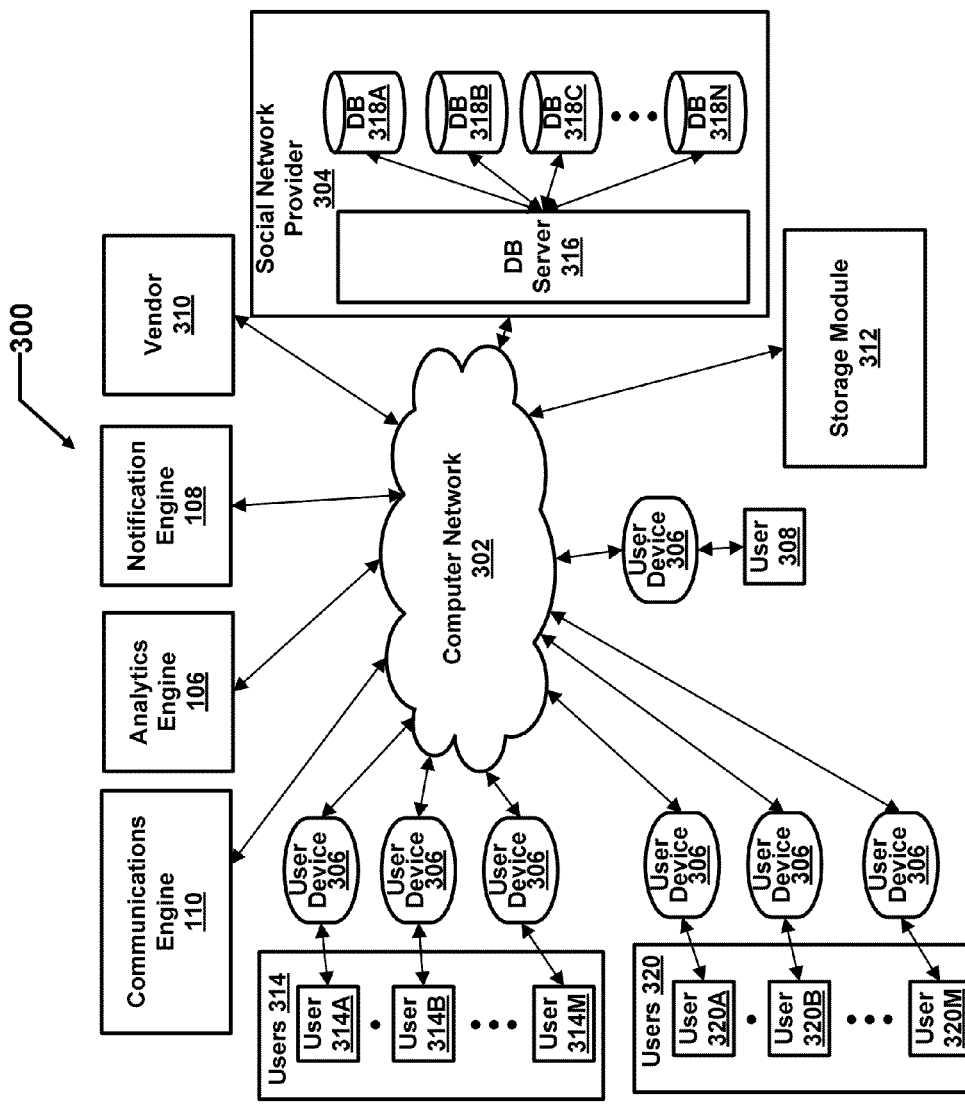
FIG. 3 is a block diagram of a system for communicating messages.

FIG. 3 is a block diagram of an example of a system 300 for communicating items, e.g., communicating messages (e.g., multimedia messages) about significant events from a publisher user to a reader user. In some examples, the publisher user and/or the reader users are members of a community that participates in a social network or other type of community associated with the system. In this example, a computer network 302 connects a social network provider 304 (such as Facebook® or Google+®) with user devices 306 such as workstations, mobile devices, mobile computers, for communicating across the computer network 302. In some examples, the social network provider can be the operator or host of the system in addition to or instead of an existing social network provider. In other examples, the system operates independently from any social network and is hosted on a server not shown), and users do not need to be members of a community or social network to utilize the system.

A publisher user 308 can create, write, dictate, preform, copy, define, or otherwise transcribe media messages, enter instructions about communication items, criteria, editors, readers, and communication times, for example; give orders to vendors 310 and give orders to storage modules 312 regarding media communications (we sometimes use the terms communications and media communications interchangeably), and other communication items for delivery to reader users 314 (314A, 314B, . . . , 314M). Publisher-permitted editor users 320 (320A, 320B . . . , 324N) review, modify, augment the media communications and other items for delivery to the reader users 314, as described in more detail below. A Communication engine 110 facilitates identification of the location, status, interest profile (e.g., affinities) and other current and historical data of the person described in the communication or for the intended reader users 314 that can be accessed by an authenticated publisher user 308. For example, an employer may learn about the hobbies or recreational activities of a new employee. A Notification Engine 108 facilitates identification of the significant events of individuals of interest to an authenticated publisher user 308. For example, a Notification Engine 108 scans various data sources (e.g., websites; periodicals such as newspaper websites, magazine websites, and scientific journal websites; and/or social networking facilities) upon demand or on a periodic basis, e.g., daily, to identify information (e.g., news items) associated with specified individuals, e.g., individuals on a list of individuals to be tracked. Analytics Engine 106 uses information from various databases to facilitate the composition, by the publisher user 308, of an appropriate communication item to be delivered, published, or otherwise provided to reader users 314.

In some examples, the social network provider 304 supplies a database server 316 to the computer network 302. The database server has one or more databases 318 [318A, 318B, . . . , 318N], for storing a wide variety of information useful for or related to the operation of the system, including user instructions, orders, and media messages as well as the profile and historical data of socially networked individuals together with information on vendors and distributors and the logistics involved in facilitating the messaging capability provided by the system.

Figure 4:
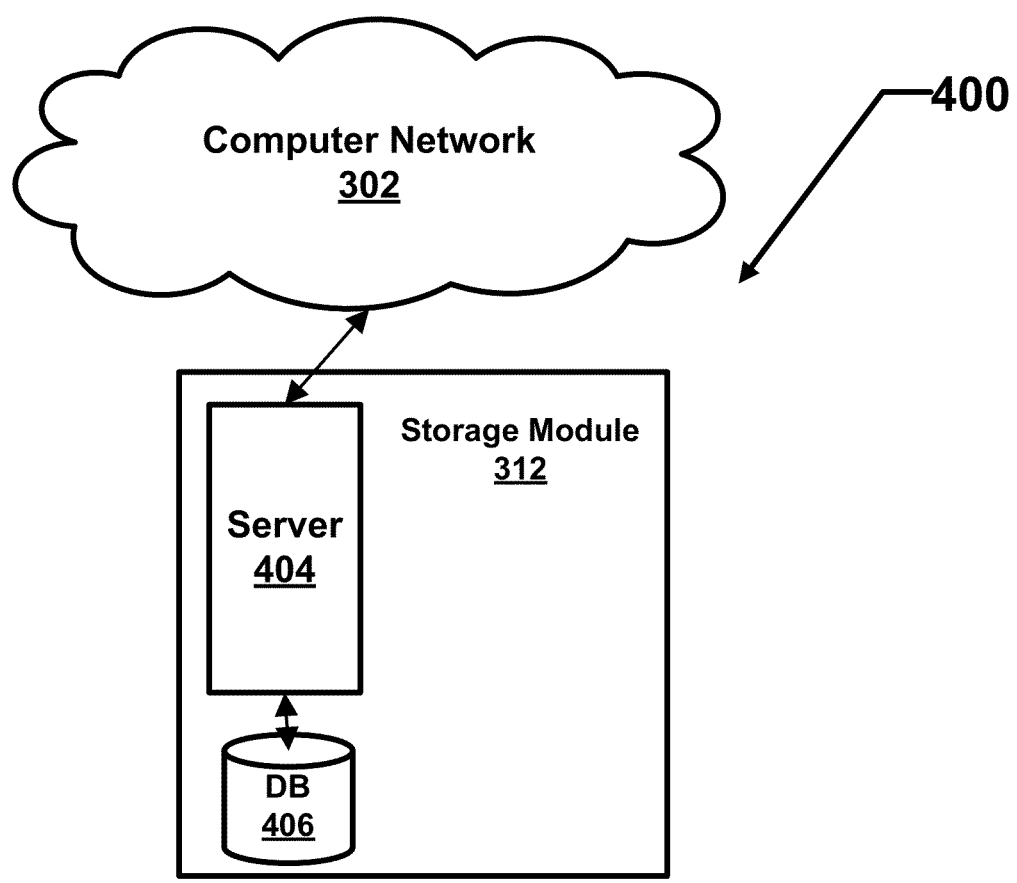
FIG. 4 is a block diagram of a life event storage module.
Figure 5:
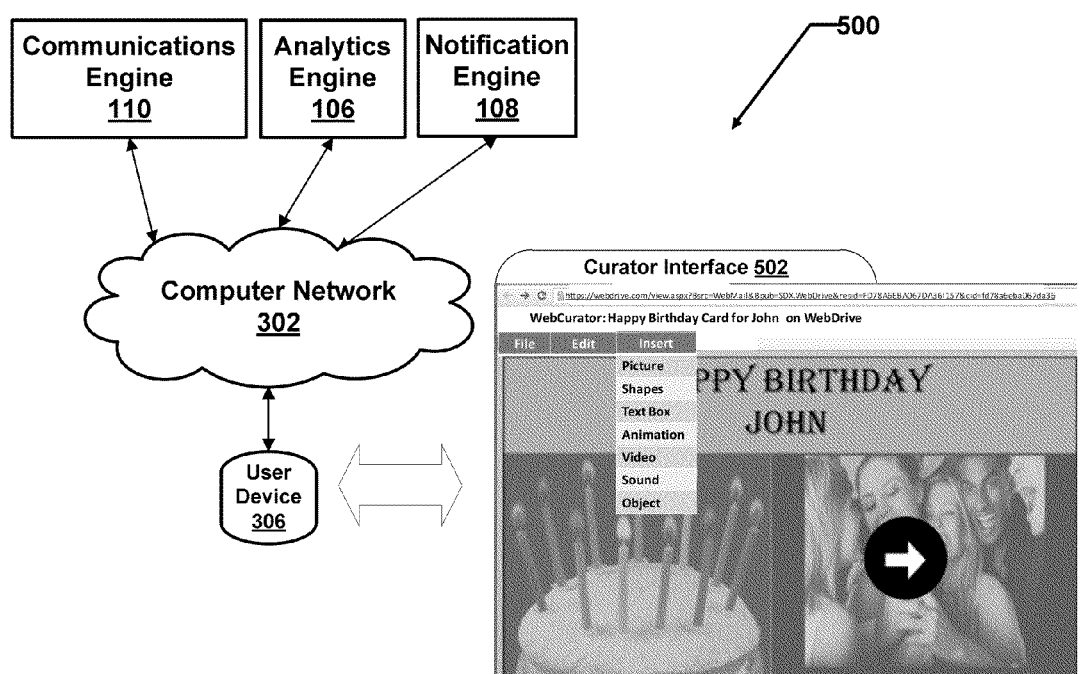
FIG. 5 is view of a publisher interface.

FIG. 4 is a block diagram of a network-based digital storage component 400 including a storage module 312 for the system 300. The storage module 312 provides a secure facility for storage of communication items, such as digital multimedia, scanned documents or photographs, and a wide variety of other items, for social publishing and other communication from one person to another as facilitated by the system 300. For instance, each publisher user is assigned a digital capsule in the storage module 312 for storage of digital materials such as text, photographs, videos, scanned documents, recorded conversations, and other digital materials. If the publisher user responded to prompts provided by the system, the user's responses to those prompts are also stored in the user's digital capsule. A database server 404 in the storage module 312, connected to the computer network 302, stores a wide variety of information including information associated with inventory, transaction history, status, and scheduled delivery dates for communication items stored in the storage module 312. A database server 404 stores digital media in a database 406. The information on the server may be replicated to an offsite server for backup redundancy, FIG. 5 is an example publisher curating interface 500 of the system 300. The publisher's user device 306 displays the publisher cunning interface 500, which provides an editing capability to a publisher. Through the publisher curating interface 500, a publisher can set up identification for notifications by selecting or specifying significant event persons; curate information about a significant event person into a message for a reader by inserting or deleting text, images, video into a multimedia message and rearranging the display of the components of the multimedia message; selecting a reader from a list of potential readers; and/or control the communication and/or delivery of the message to the reader. For instance, the curating window 502 allows the publisher user to insert pictures, shapes, text, animation video, sound or any other multimedia object. The publisher communication interface 500 is also operable to transcribe or edit media messages, which may be in the form of e-mail, voice, images, scanned or real-time photographs, or video. The messages may be served up by the Analytics Engine 106 as the result of searching various data sources for relevant information, as described in greater detail below. The publisher communication interface 500 may also be made available to an editor user 320B for review, revision, approval, and/or commenting on the communication item generated by the publisher user. Alternatively, a distinct editor communication interface may be provided, as described in more detail below.

The Communication engine 110 of the system 300 determines the location, status, and/or affinities and other current of historical information of the significant event person and of the reader user.

The Analytics Engine 106 may be employed to assist the publisher user in selecting a delivery date (e.g., by using historical data to forecast personal milestones of a reader user, by analyzing news articles or social networking facilities to identify the occurrence of a significant event, or by another method); an appropriate communication item for delivery (e.g., by identifying information about or associated with the significant event person that is appropriate for inclusion in a message about the particular significant event or by forecasting future needs and wants of a reader user); delivery times (communication times) best suited for the reader user; and/or delivery methods (e.g., the reader user's most recent email address or phone number).

Example media messages include congratulations on promotions or achievements, autobiographical summaries, obituaries, sympathy notes, birthday wishes, welcome messages to new employees, or other messages. For instance, if the publisher user is an agent of a corporation or an institution such as a school, a city, state or federal government, an example video media message may be emailed to new employees or new clients as a welcome message. In some examples, a media message may include last words or a more extensive message from a publisher user to his survivors, such as the publisher user's children, including the publisher user's autobiography to be delivered in full or released in stages.

Figure 6:
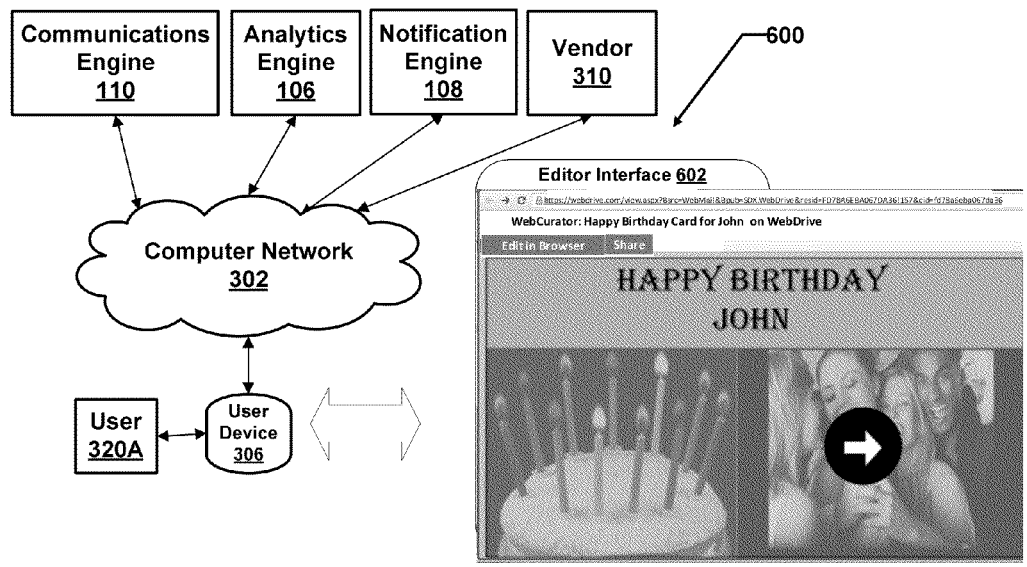
FIG. 6 is a view of an editor interface.

FIG. 6 illustrates an example of an editor's interface 600 of the system 100. The user device 306 displays an editor's media message selection and modification interface 600, which provides an editing window 602 allowing the editor user 320A to select a publisher's communication for viewing, revising, approving, or commenting upon. The interface 600 maybe a shareable web editor designed for collaboration via Internet access to the document (e.g., Sky Drive® by Microsoft®, or Google Drive® for Google® Docs). The editor user may be the same person as the publisher user or may be another person designated by the publisher user. The editing selection interface 600 allows the editor to review, modify, correct, amend or add to the message composed by the publisher user. Upon completion of the editor's task, the revised media message is saved and can be served up to the publisher user for delivery to a reader or sent directly to a reader, who may have been preselected by the publisher user.

Figure 7:
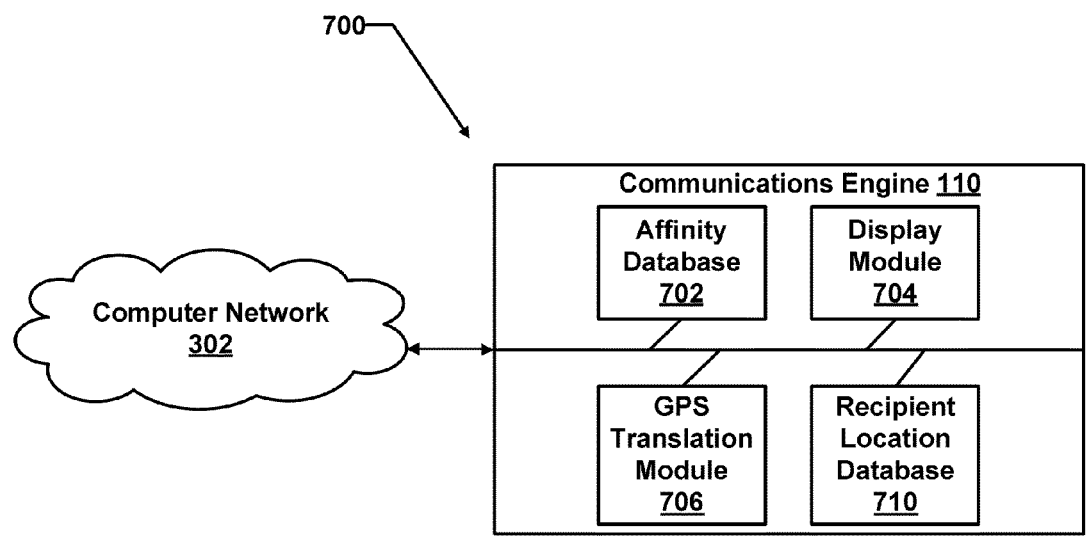
FIG. 7 is a block diagram of a Notification Engine.

FIG. 7 is a block diagram of a Communication engine 110 of the system 300. The Communication Engine 110 facilitates identification of a significant event person and provides criteria used by the Notification Engine 108 to trigger notification of the curator for composing a message, publishing or delivery of communication items) for a publisher user 108 by providing information about a reader user's physical location, profile interest information, and/or affinity information including current or historical data on purchase transactions, income, socio-economic status, voter registration or other information that is web-accessible. In some examples, the location, interest, and affinity and other current and historical information may be displayed by a display module 704 on a webpage belonging to or accessible by the publisher user. The communication engine 110 includes an affinity database 702 for storing significant event person and reader user affinity information and a reader location database 710 for storing the physical location of a reader user. The reader location database 710 may receive data relevant to the location of a reader user from a GPS translation module 706 or may obtain the reader user's location from the Analysis Engine's analysis of websites or other sources of information. For example, the publisher user may have composed a sympathy note regarding an individual killed in an accident; the Communication engine determines that the next of kin is traveling in another country and thus likely to be reachable by email but not by phone.

Figure 8:
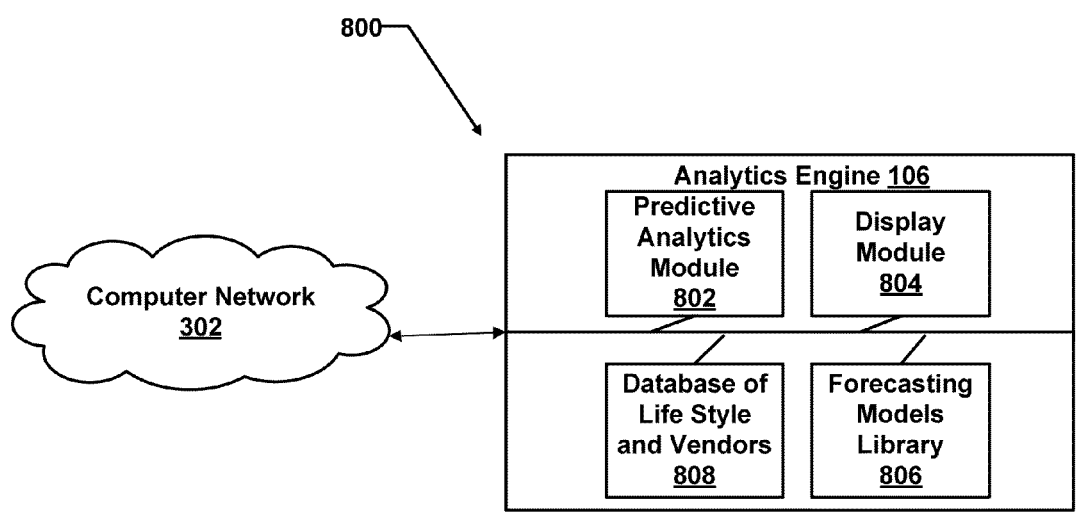
FIG. 8 is a block diagram of a Communication Engine.

FIG. 8 is a block diagram of the Analytics Engine 106 of the system 300. The Analytics Engine 106 facilitates identification and notification of trigger events for significant event persons, curation of an appropriate message upon notification, and publication or delivery of communications in response to a significant event on behalf of publisher user 308 by inferring information about the person described in the communication item from one or more data sources or determining or inferring milestone events fix the reader user 314 or for the person described in the communication item, among other things. The person described in the communication item may be the intended reader of the communication item, the publisher of the communication item, both the reader and the publisher, or neither the reader nor the publisher.

A predictive analytics module 802 in Analytics Engine 106 applies search algorithms and forecasting models stored in a search and forecasting models library 806 to analyze present and/or historical subject user data in view of data stored in a database 808 containing data related to identify milestone events and to suggest appropriate media messages or items for a reader user. The predictive analytics module 802 implements a variety of forecasting techniques beyond simple algorithms, such as future date calculation, including statistical techniques such as machine learning (e.g., as applied by IBM's Watson computer), game theory, and data mining, to analyze current and historical data to determine significant event triggers for notification, to make predictions about future readers, to identify communication media messages, and to identify appropriate delivery times and methods, among a wide variety of other analyses and algorithms. For example in the case of an autobiographical communication item of a grandfather (the publisher user), the reader user is the projected offspring of a current member in the system but the publisher user may incapacitated at the time of publication and delivery or both. By a computer-implemented method, data relevant to the publisher user may be extracted from his profile in the system 300 and/or generated implicitly based, at least in part, on the publisher user's stored profile together with historical data by a predictive analytics algorithm based on historical data. Based on the extracted or generated data, a significant event is identified, content for a communication is selected, appropriate reader users are identified, and/or other analysis is performed, in some cases without input from the publisher user.

In some examples, Analytics Engine 106 may use data specific to a user to identify potential milestone events (e.g., to identify a bar mitzvah date for a child based on the child's birth date or to identify appropriate religious holidays based on the user's specified religious affiliation or a prevailing religion in the region where the user lives). In some cases, the predictive analytics module 802 may also incorporate present or historical data or both to identify relevant information for the communication subject or reader user or both that are in keeping with preferences of the publisher user. In other examples, the Analytics Engine 106 analyzes publically available sources of information and/or private sources of information to which it has access, including, e.g., social networking facilities, online or mobile periodicals such as newspapers or magazines, and websites, to identify the occurrence of significant events associated with the reader user or with the person whom the communication is about. For instance, the Analytics Engine 106 may analyze trade journal websites to set up criteria so the Notification Engine 108 can identify when a target person receives an award or a promotion.

A display module 804 of the Analytics Engine 106 may display the significant events of an individual of interest (e.g., a reader user or another individual specified by the publisher user) on a webpage belonging to or accessible by the publisher user. These events with associated actions can be selected for notifications stored in the Notification Engine 108. In some embodiments, upon notification by the Notification Engine, the Analytics Engine 106 may automatically communicate messages of a significant event relevant to a reader user, such as a birthday, to the Communication Engine 110, which sends the notices to relatives of the reader user, who can act as publisher users. The Analytics Engine may use information about a reader user found in various databases to determine when to send out the notices.

In some embodiments, the predictive analytics implemented by the Analytics Engine incorporate the robust, optimizing forecasting techniques of Pinto et al. (U.S. Pat. No. 7,499,897, issued on Mar. 3, 2009; U.S. Pat. No. 7,562,058, issued on Jul. 14, 2009; U.S. Pat. No. 7,725,300, issued on May 25, 2010; U.S. Pat. No. 7,730,003, issued on Jun. 1, 2010; U.S. Pat. No. 7,933,762, issued on Apr. 26, 2011; and U.S. patent application Ser. No. 10/826,949, filed Apr. 16, 2004, the contents of all of which are incorporated herein by reference), that manage historical data using missing values, which must be inferred.

The Analytics Engine can act as a surrogate for the publisher user 308 by specifying communications and services or any other communication items for placement into storage. Provided the potential reader user 314 is registered in the system 300, the Communication Engine 110 will determine the location of the reader user, e.g., by GPS tracking or similar means. The reader user's interests and status may be available in the reader user's profile, which, taken together with historical data, enable the Analytics Engine 106 utilizing inferences from missing data, if necessary, to determine an appropriate gift to accompany the message and an optimal time for delivery. The delivery time is selected by a predictive analytics algorithm, based on historical data specific to the reader user.

In some embodiments, the Analytics Engine acts as a surrogate of a publisher user 108 to generate communication items (e.g., messages, sympathy tribute selections, and/or delivery instructions) based on data, e.g., historical data, specific to the reader user. For instance, the Analytics Engine maybe configured as described by Gruber et al. (U.S. patent application Ser. No. 12/987,982, filed Jan. 10, 2011, the contents of which are incorporated herein by reference) to include an automated assistant receiving user input; an active ontology with representations of concepts and relations among concepts drawn from various databases of historical data (for instance, for the case in which the publisher user is the agent of a corporation, the corporate personnel database may be referenced); and a language interpreter parsing the publisher user input to derive a representation of publisher user intent in terms of the active ontology together with a services orchestration to output responses and instructions to implement the publisher user's intent. In the example of FIG. 6, the reader user is the projected offspring of a current member of the system and the publisher user, who wants to send a birthday greeting to the reader user, is incapacitated, at the reader user's birthday. By a computer-implemented method, data relevant to the reader user may be extracted from his profile, generated implicitly based, at least in part, on the reader user's stored profile with the system together with historical data by a predictive analytics algorithm based on historical data, and/or obtained from publically available or privately accessible information sources. Based on the extracted or generated data a communication is selected, generated, and delivered, in some cases without input from the publisher user.

Figure 9:
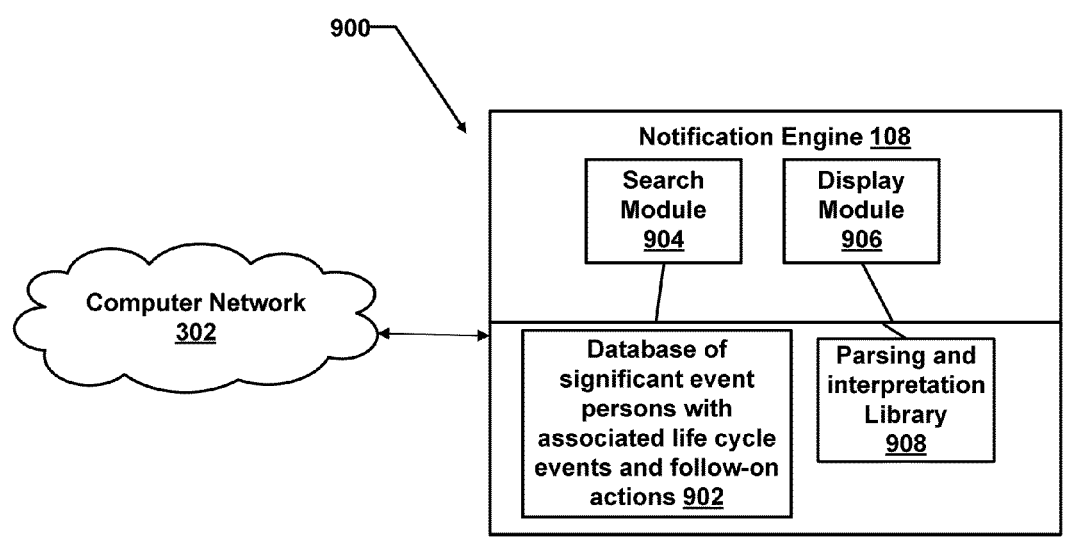
FIG. 9 is a block diagram of an Analytics Engine.
Figure 10:
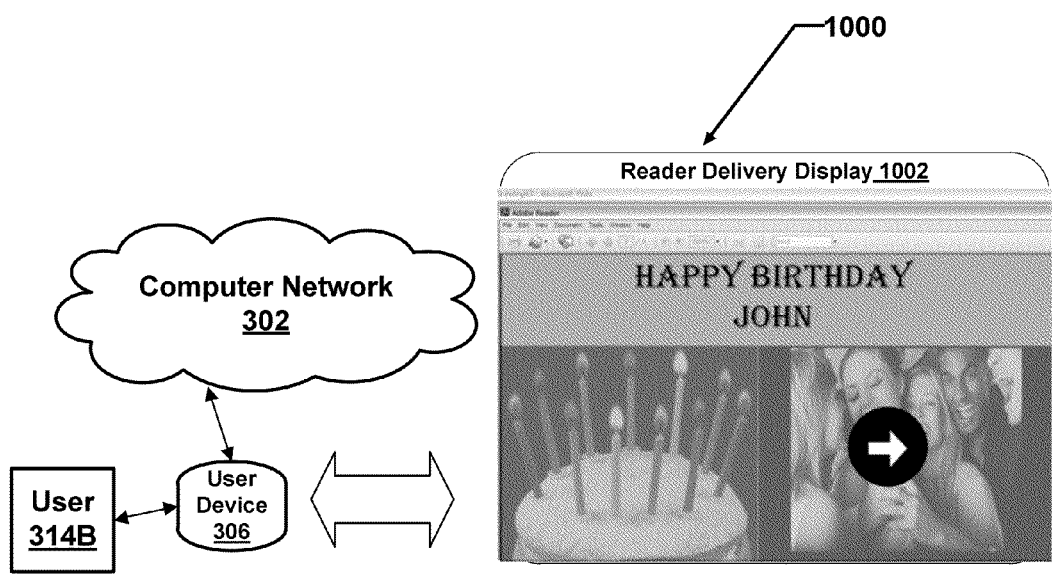
FIG. 10 is a view of a reader display.

FIG. 9 is a block diagram of a Notification Engine 108 of the system 300. The Notification Engine 108 facilitates publishing or delivery of communications for a publisher user 308 by detecting significant events of individuals significant to the publisher as listed in a data file 902. For example, a publisher user may be notified about the death of friend by means of a search module 904 supported by a parsing and interpretation library 908. The publisher user may then compose and publisher or deliver a sympathy message to the friend's family. In some examples, information the individual whose significant event has been detected (referred to here as the tracked individual) may be displayed by a display module 906 on a webpage belonging to the publisher user. The Notification Engine 108 may also display the tracked individual's profile within the system 300 for confirmation of the individual's significant event. The Notification Engine 108 includes a tracked individual affinity database 112B for storing tracked individual affinity information As an example, the publisher user is an agent of a corporation; e.g., the publisher user is a Human Resources professional. The data lists of the Notification Engine 108 include current employees, retired employees, and newly hired employees who have not yet started to work. The Notification Engine identifies a newly hired employee whose start date is in the future and alerts the publisher user or another module of the system 300. The publisher user composes a welcome notice from a template on behalf of the chief executive officer. The welcome notice also includes automatically integrated material, such as a listing of the new employee's awards, education, or employment history, assembled from various data sources by the Analytics Engine to personalize the message. The message is then reviewed by an associate of the publisher user and scheduled for publication or delivery on the employee's start date. In some cases, publication or delivery is scheduled with the aid of the Communication Engine, e.g., to account for the new employee's time zone and location in scheduling the publication or delivery.

FIG. 8 is an example reader display interface 1000 for the example in which the reader user is a member of a social network implementing the system 300. A reader delivery display 1002 indicates the arrival of a communication or delivery of a communication item. A reader display window 1002 shows the multimedia message that the publisher 308 has delivered. A similar process occurs in the case of a sympathy tribute or other item, particularly when the item is a vendor coupon that is printable. The reader user 314B is given the opportunity to arrange for delivery, for example by a common carrier such as FEDEX, UPS, DHL, or the USPS. Alternatively, the reader user is put into contact with the vendor of the physical or digital item to arrange for delivery. In other examples, the reader user is notified directly about the publication or delivery of a communication item, for instance, via an email message to the reader user's email address or a phone call or SMS to the reader user's mobile phone.

Figure 11:
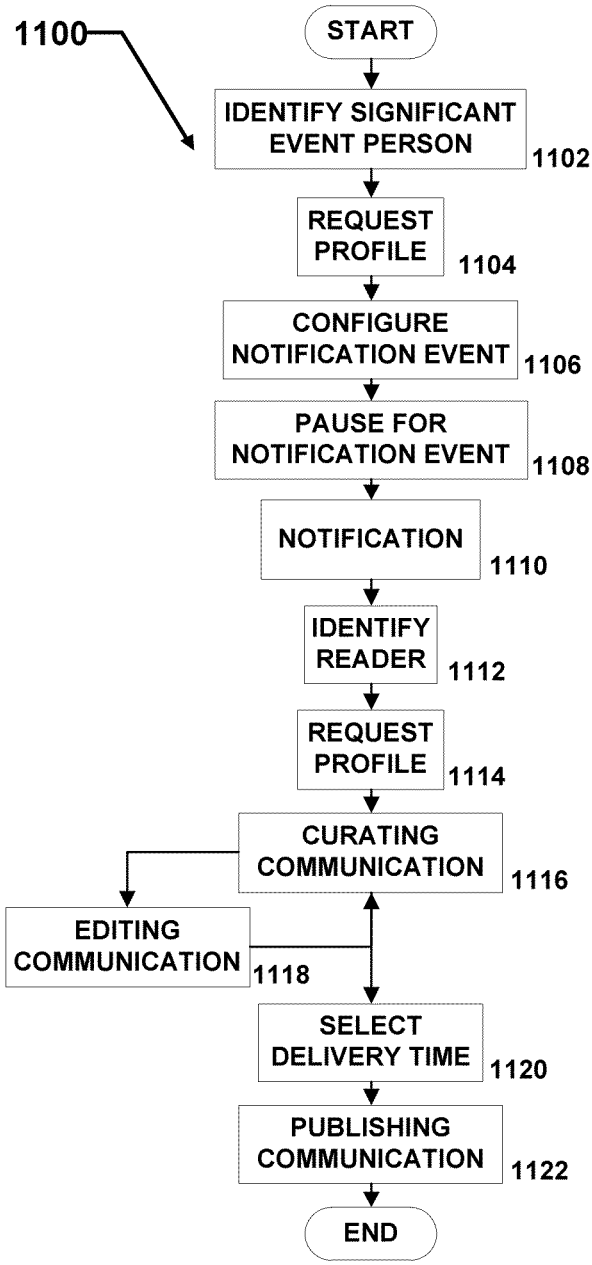
FIG. 11 is a flowchart of a process for publishing a communication in response to a life event.

FIG. 11 is a flowchart of an example process 1100 for communicating a multimedia message in the system 300. In the process 1100, a publisher user 308 identifies a Significant Event Person (Step 1102) then requests that person's profile from the Communication Engine 110 (Step 1104). With that profile and other additional information, the publisher user 308 configures a notification event that is saved in the Notification Engine's database (Step 1106). There is a pause in the action until the Notification Event occurs. (Step 1108). Upon notification (Step 1110), the publisher starts assembling a communication by identifying the reader (Step 1112) by requesting a profile (Step 1114). Then the publisher curates the communication from the selected information and additional input (Step 1116). The communication draft is edited (Step 1118) and served back to the publisher who selects a delivery time (Step 1120) and then queues up the communication for publication (Step 1122).

For instance, an attorney monitoring a list of his clients receives notification that one of his clients has received a promotion. The publisher user composes a message to be sent to the individual, e.g., by filling in a template with publisher-generated content (e.g., a personalized message) together with information about the individual from various data sources supplied by direct search by the Communication Engine and/or with the help of the Analytics Engine 106. For instance, the attorney may compose a congratulatory message to his client following a template, include press releases about the client's promotion collected by the Analytics Engine, and add a paragraph inquiring about additional business opportunities facilitated by the client's new position. An editor reviews and revises the message (Step 903). For instance, the attorney's associate as a designated editor 320B reviews the saved message and makes a minor emendation. The publisher user conducts a final review of the message and sends the message or arranges for the system to send the message on his behalf in some cases with the help of the Communication Engine. The Communication Engine 110 directs the message to the reader user at his current location (e.g., the message is directed to the attorney's client, who is presently staying at a hotel in Shanghai. The reader user 314D receive and reads the message. The reader user may be given the opportunity to acknowledge receipt and confirm delivery and even reply to the publisher user 308 or to his proxy.

Figure 12:
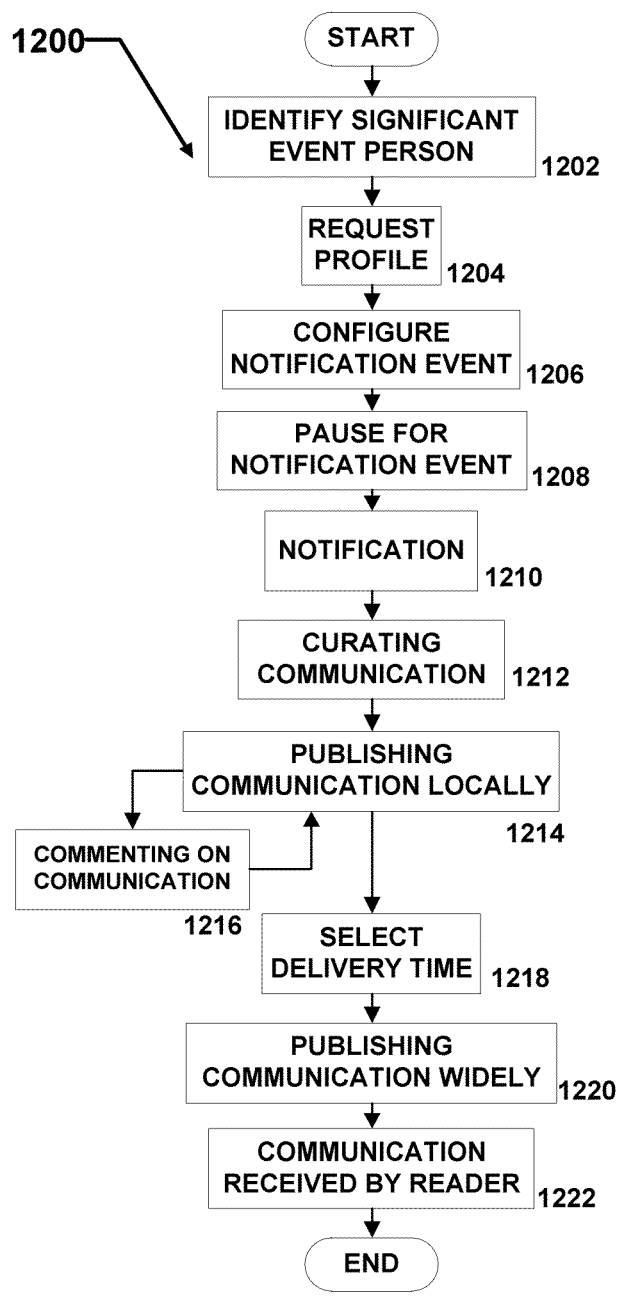
FIG. 12 is a flowchart of a process for publishing a comment on a communication in response to a life event

FIG. 12 is a flowchart of an example process 1200 for commenting upon a communication item. In this example, the system is used to compose an obituary for a deceased individual to be published on a website accessible to relatives, colleagues, and friends of the deceased user. The next of kin as publisher user 308 composes an obituary and publishes the obituary on a website hosted by the system 300. The publisher user 108 sets up the restriction that relatives, colleagues and friends designated as editors can append comments to the obituary but cannot alter the main content of the obituary. The publisher user 108 receives notification of the individual's death either directly or through the Notification Engine 108 (Step 1210). The publisher user then composes the obituary drawing on various data sources at times with the aid of the Communication Engine 110 and the Analytics Engine 106 (Step 1212) and saves the obituary. In some examples, the obituary is directly published to reader users 314 (Step 1220) on a website hosted by the system 300. In other examples, the obituary is published for editorial comments by editor users 320 (Step 1216) subject to review by the publisher user 308 (Step 1220) before general publication to readers 314 (Step 1220). In some cases, after publication to reader users, comments can be added by editor users without further review (Step 1218).

Figure 13:
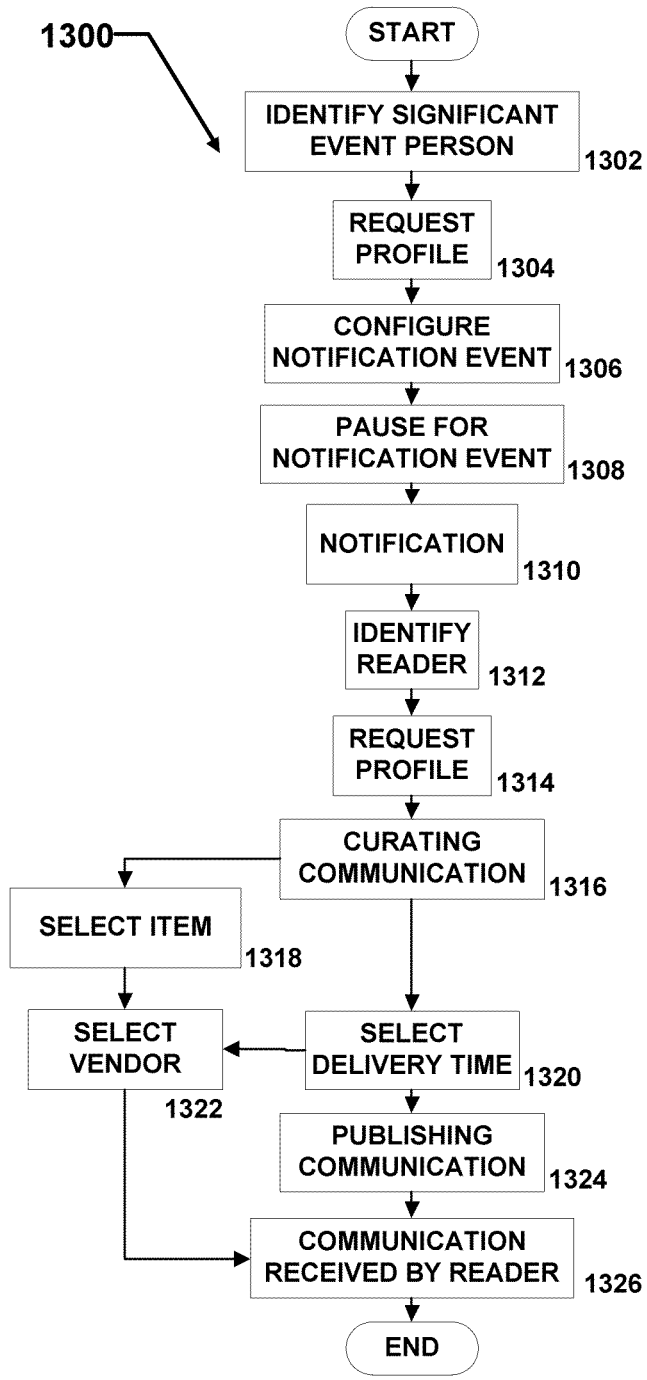
FIG. 13 is a flowchart of a process for transferring an item accompanying a communication in response to a life event.

FIG. 13 is a flowchart of an example process 1300 for distributing a tribute or gift in the system 300. In the process 1300, a publisher user 308 receives notification of a significant event occurring to an individual of interest either directly or with the help of the Notification Engine 108 (Step 1310). The publisher user 308 composes a communication item for a selected reader 314D drawing on various data sources at times with the help of the Communication Engine 110 and Analytics Engine 106 (Step 1316). For example, the significant event is the death of an individual on the data list of significant individuals for the publisher user 308 and the intended reader user 314D is the next of kin of the deceased individual. To accompany the publication or delivery of the communication item, e.g., a sympathy note, the publisher user 308 selects a tribute or gift for the selected reader 314D, drawing upon the preference and affinities of the reader either directly or with the help of the Communication Engine 110 (Step 1318). For example, a floral arrangement may be ordered or a donation may be made to a charitable organization designated by the deceased individual or by the selected reader 314D. The publisher user 308 delivers the communication item (Step 1324) and arranges with a vendor 310, which in this example may be a florist or floral delivery service or charitable organization (Step 1322). The reader user 314D may be given the opportunity to acknowledge receipt and confirm delivery and to reply to the publisher user 308 or the publisher user's proxy (Step 1326).

In some embodiments, the publisher user 308 is an agent of a corporation or other entity who sends a communication item to current or past employees in good standing, e.g., a congratulatory message including stock options, or, more personally, an award or achievement plaque. In some embodiments, the Analytics Engine acts as a surrogate of a publisher user 308 in that the Analytics Engine is configured to generate a communication. For instance, for a publisher user who is an agent of a corporation, the Analytics Engine uses the corporate personnel database to identify reader users and, based on their profiles, select an appropriate communication, e.g., congratulations or achievement or other valuable communication.

In some instances, the system operates within a social network of family members. The publisher user may be a member of an older generation and the reader user may be a member of a younger generation. In some cases, the intended reader user is not yet a member of the social network, either because the reader user has not yet enrolled or because the reader user has not yet been born. In some cases, the publisher user may be incapacitated or even dead at the time of delivery (e.g., the publisher user may be an incapacitated or dead grandparent of the reader user). If the publisher user is incapacitated or dead, the system may carry out the instructions of the publisher user and request confirmation as appropriate from a designated proxy of the publisher user, such as a parent of the reader user or an executor of the publisher user's estate. In some cases, the system requests confirmation of the identity and/or role of the designated proxy. For instance, if the executor of the publisher user's estate logs into the system using the deceased publisher user's credentials, the executor may be considered to have been authenticated as the publisher user's proxy.

In some instances, the publisher user is an institution or other entity or an agent of such an institution or other entity, such as a school or a city, state, or federal government; or a company, or a trust or foundation, or a non-profit organization, for example. The reader user may be a current employee in good standing or a past employee, e.g., a retiree or someone who was terminated or resigned, or a current or past individual client. For a variety of reasons the institution or entity may find it useful to maintain a relationship with the employee and to communicate items at communication times to the employee or client to maintain the relationship. For instance, the publisher user may use the system to send a message to the reader user, such as a holiday greeting, a message of congratulations on a promotion, a greeting for a birthday or other anniversary, a reminder of a spouse's or child's birthday, or a suggested message to be forwarded to the spouse or child. The publisher user may also use the system to communicate a sympathy message to the reader user's next of kin upon the death of the reader user.

In some cases, the Analytics Engine may ad as a surrogate for the publisher user and may use the corporate personnel database to identify reader users and, based on the profiles of the reader users, determine appropriate milestones and/or communications. For instance, an Analytics Engine customized to a particular company may track the addresses, email addresses, or other contact information of past employees or clients to enable the company to maintain relationships with the past employees. In other examples, the system may provide an employee feedback portal for a company, in which employees of the company (acting as publisher users) submit suggestions, complaints, or comments, which are then forwarded, singly or in aggregate, to the human resources department (acting as the reader user) of the company.

In other instances, the system is used by a group of people, such as a group of friends, acquaintances, coworkers, or another group of people. For instance, a friend may act as a publisher and arrange for the delivery of a birthday greeting to another friend through the system.

In some instances, when the system is a social network implemented system, the system enables the communication of items from a publisher user to a reader, who may not necessarily be a member of the social network or user of the system, through a proxy reader user who is a member or user of the social network or system. For example, a grandfather may use the system to set up the delivery of a birthday greeting to his two-year-old granddaughter on her tenth birthday. The grandfather dies before the granddaughter turns ten. When the granddaughter does reach her tenth birthday, she is too young to enroll in the system. The analytics module is able to determine the communication item and the delivery (communication) date (the granddaughter's tenth birthday), but is unable to send a delivery message to the granddaughter directly because she is not a member of the system. The analytics module can identify the granddaughter's parents as proxies for the granddaughter and send the delivery message to the parents. For instance, the parents may be automatically considered the proxy of the reader or may be asked to provide authentication of their relationship with the reader prior to being considered the proxy of the reader. In some cases, the parents, as proxy for the reader, may be asked to approve the relationship between the reader and the publisher user and/or the appropriateness of the communication item.

In some instances of the use of the system, the publisher may be the same person as the editor. For example, the publisher composes his own summary of his significant events as a future memorial or obituary.

Implementations of the system are not limited to social networks or need not span multiple generations, but some implementations will be in the context of social networks or will be multigenerational or both.

As desired, the system may include more or fewer than the components illustrated.

The system is described above with reference to block and flow diagrams of systems, methods, apparatuses, and/or computer program products according to examples. In some instances, the publisher and reader users may access the system by desktop or laptop computers. In some embodiments, the publisher and reader users may access the system by mobile devices such as smart phones. In some embodiments, the publisher and reader users may access the system by tablet computers or any commercial computing device connected to the internet. In some cases, the system may be constructed to operate on the internet independent of existing systems. The significant event system may operate using existing social networks, e.g., Facebook®, Google+®, or Yammer™ as platforms using existing application interfaces open to website developers.

One or more blocks of the block diagrams and flow diagrams, and combinations of blocks in the block diagrams and flow diagrams, respectively, can be implemented by computer-executable program instructions. Some blocks of the block diagrams and flow diagrams may not necessarily need to be performed in the order presented, or may not necessarily need to be performed at all, in sonic cases.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special purpose hardware and computer instructions.

While the system has been described in connection with certain examples, is the system is not limited to the disclosed embodiments, but on the contrary, includes various modifications and equivalent arrangements. Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or communication data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network. ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

Other implementations are also within the scope of the following claims.

What is claimed is:

1. A computer-implemented method comprising
in connection with an occurrence of a significant event of a person the conditions for occurrence of which had been defined earlier by a user, automatically generating a page of a website or a mobile application or an email application when the conditions for the occurrence of the significant event have been determined to have been satisfied, the page including:
information generated by and received from the user,
information about the person, and
information about the person that has been automatically identified on and automatically retrieved from at least two of the following sources: (a) online or mobile social networking facilities, (b) online or mobile periodicals, and (c) websites, each of the sources being publicly accessible without requiring registration with the source, and
serving the page for display through a web browser or a mobile application or an email application, the page being served in the future to parties whose identity is undetermined with respect to the user and the significant event at the time when the conditions for occurrence are defined.

2. The method of claim 1, wherein the page is served after the user is given an opportunity to curate the page.

3. The method of claim 2, wherein curating the page includes adding content to the page, removing content from the page, and/or changing content on the page.

4. The method of claim 1, wherein the page is served to an editor and then re-served after the editor has curated it, and the editor is designated by the user.

5. The method of claim 1, wherein the page is served without input from the user.

6. The method of claim 1, wherein notification of the occurrence of the significant event is given automatically to someone, in particular someone who needs to take some action regarding the event.

7. The method of claim 6, wherein notification of the occurrence of the significant event is given automatically to the user.

8. The method of claim 1, further comprising detecting the occurrence of the significant event.

9. The method of claim 1, wherein detecting the occurrence of the significant event includes conducting an automated analysis of publicly available (a) online or mobile social networking facilities, (b) online or mobile periodicals, and (c) websites.

10. The method of claim 9, wherein conducting an automated analysis includes conducting the analysis in view of information provided by the user defining the conditions for occurrence of the event.

11. The method of claim 1, wherein the user is a service provider and the person is a client of the service provider.

12. The method of claim 1, wherein the user is an agent of a company, the person is an employee of the company, and the page is served as a corporate email message or as a website on an internal corporate network.

13. The method of claim 1, wherein the user is an agent of a charitable foundation or university and the person is a donor to the charitable foundation or university.

14. The method of claim 1, wherein the page includes information that is generated by and received from another user and is about the person.

15. The method of claim 1, wherein the page includes information that is generated by and received from the person and is about the person.

16. The method of claim 1, wherein the event is a death of the person.

17. The method of claim 16, wherein serving the page includes serving the page to a relative of the person.

18. The method of claim 1, wherein the event is a birthday or anniversary of the person.

19. The method of claim 1, wherein the event is a change in employment status of the person.

20. The method of claim 1, wherein serving the page includes delivering a notification of the page to a recipient via a private communication.

21. The method of claim 20, wherein the recipient is the person.

22. The method of claim 20, wherein the private communication channel includes email, telephone, short message service (SMS) messaging, and/or social network facilitated communication.

23. The method of claim 1, wherein serving the page includes publishing the page as a website.

24. The method of claim 1, wherein the website is available to a group of people sharing a common affiliation.

25. The method of claim 1, comprising
notifying the user that the significant event is going to occur with respect to a person;
receiving from the user, the person, or another person a communication that relates to the significant event and to the first person and that has been curated at least in part from information that has been accumulated automatically from online resources,
wherein the page is automatically generated based on the curated communication.

26. The method of claim 1, further comprising receiving information provided by the user defining at least one of the conditions for occurrence of the significant event.

27. The method of claim 1, comprising receiving an approval of the automatically generated page.

28. The method of claim 1, wherein automatically generating a page includes automatically generating the page based on a communication that has been generated by the user.

* * * * *

UNITED STATES PATENT AND TRADEMARK OFFICE
CERTIFICATE OF CORRECTION

| | | |
|---|---|---|
| PATENT NO. | : 8,694,633 B2 | Page 1 of 1 |
| APPLICATION NO. | : 13/650941 | |
| DATED | : April 8, 2014 | |
| INVENTOR(S) | : Richard J. W. Mansfield et al. | |

It is certified that error appears in the above-identified patent and that said Letters Patent is hereby corrected as shown below:

Title Page 2, Item (56) References Cited, Col. 2 (Other Publications), Line 22, delete "unbord" and insert -- unborn --, therefor.

Signed and Sealed this
Eighth Day of July, 2014

Michelle K. Lee
*Deputy Director of the United States Patent and Trademark Office*